US012661817B2

(12) United States Patent
Kato

(10) Patent No.: US 12,661,817 B2
(45) Date of Patent: Jun. 23, 2026

(54) WORKING MACHINE

(71) Applicant: Makita Corporation, Anjo (JP)

(72) Inventor: Kazuya Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 170 days.

(21) Appl. No.: 18/655,841

(22) Filed: May 6, 2024

(65) Prior Publication Data

US 2024/0383162 A1 Nov. 21, 2024

(30) Foreign Application Priority Data

May 18, 2023 (JP) ................................ 2023-082235

(51) Int. Cl.
*B26B 15/00* (2006.01)

(52) U.S. Cl.
CPC .................................. *B26B 15/00* (2013.01)

(58) Field of Classification Search
CPC ...... B26B 15/00; A01G 3/033; A01G 3/0335; A01G 3/037
See application file for complete search history.

(56) References Cited

U.S. PATENT DOCUMENTS

| | | | | |
|---|---|---|---|---|
| 8,276,280 | B2 * | 10/2012 | Lee | A01G 3/037 30/194 |
| 8,434,234 | B2 * | 5/2013 | Chen | A01G 3/037 30/247 |
| 8,813,370 | B2 * | 8/2014 | Pellenc | B26B 15/00 30/247 |
| 9,179,605 | B2 * | 11/2015 | Yamaoka | A01G 3/037 |
| 9,604,383 | B1 * | 3/2017 | Wilcher | B23D 29/005 |
| 10,172,292 | B2 * | 1/2019 | Zador | A01G 3/037 |
| 11,358,297 | B2 * | 6/2022 | Pellenc | B26D 7/22 |
| 11,565,433 | B2 * | 1/2023 | Ma | A01G 3/021 |
| D1,003,137 | S * | 10/2023 | Bert | D8/61 |
| 12,202,155 | B2 * | 1/2025 | Shu | B26B 13/04 |
| 2010/0192383 | A1 * | 8/2010 | Ishiguro | B26B 15/00 30/247 |
| 2016/0219793 | A1 | 8/2016 | Xianpeng | |
| 2018/0103593 | A1 * | 4/2018 | Zador | B26B 15/00 |
| 2021/0162619 | A1 * | 6/2021 | Pellenc | B26D 7/22 |
| 2021/0299894 | A1 * | 9/2021 | Lu | B26B 13/285 |

* cited by examiner

*Primary Examiner* — Ghassem Alie
*Assistant Examiner* — Richard D Crosby, Jr.
(74) *Attorney, Agent, or Firm* — Sughrue Mion, PLLC

(57) ABSTRACT

A working machine may include a working unit, a prime mover configured to drive the working unit, a housing that supports the working unit and houses the prime mover, a trigger lever extending through a through hole defined in the housing so as to be located inside and outside the housing and configured to be manipulated by a user, a sensor configured to detect a movement of the trigger lever, and a control unit configured to control the prime mover based on a detection result by the sensor. The trigger lever may be rotatably supported by the housing via a rotation shaft. The trigger lever may include a block portion that has a shape of a substantially solid of revolution about a rotation axis of the trigger lever. A peripheral edge of the through hole may include a facing edge that faces an outer circumferential surface of the block portion.

9 Claims, 9 Drawing Sheets

WORKING MACHINE

REFERENCE TO RELATED APPLICATION

This application claims priority to Japanese Patent Application No. 2023-82235 filed on May 18, 2023. The entire content of the priority application is incorporated herein by reference.

TECHNICAL FIELD

Art disclosed herein relates to a working machine.

BACKGROUND ART

U.S. Patent Application Publication No. 2016/0219793 describes a working machine including a working unit, a prime mover configured to drive the working unit, a housing that supports the working unit and houses the prime mover, a trigger lever configured to be manipulated by a user, a sensor disposed inside the housing, and a control unit configured to control the prime mover based on a detection result by the sensor. The entirety of the trigger lever is located outside the housing. The sensor is configured to detect a movement of the trigger lever located outside the housing.

SUMMARY

In the working machine of U.S. Patent Application Publication No. 2016/0219793, the sensor's detection accuracy for the trigger lever may be low since the housing is interposed between the sensor and the trigger lever. In order to improve this, it can be contemplated to define a through hole in the housing, arrange the trigger lever so as to extend through the through hole to be located inside and outside the housing, and have the sensor detect a movement of the portion of the trigger lever located inside the housing. However, in this configuration, foreign matters such as dust may enter the housing through a gap between the peripheral edge of the through hole and the trigger lever. The disclosure herein provides a technology that can prevent entry of foreign matters into a housing.

A working machine disclosed herein may comprise a working unit, a prime mover configured to drive the working unit, a housing that supports the working unit and houses the prime mover, a trigger lever extending through a through hole defined in the housing so as to be located inside and outside the housing and configured to be manipulated by a user, a sensor disposed inside the housing and configured to detect a movement of a portion of the trigger lever located inside the housing, and a control unit configured to control the prime mover based on a detection result by the sensor. The trigger lever may be rotatably supported by the housing via a rotation shaft. The trigger lever may include a block portion that has a shape of a substantially solid of revolution about a rotation axis of the trigger lever. A peripheral edge of the through hole may include a facing edge that faces an outer circumferential surface of the block portion.

The trigger lever can assume various positions relative to the housing. Depending on the position of the trigger lever, a clearance between the peripheral edge of the through hole and the trigger lever may be enlarged. Such an enlarged clearance between the peripheral edge of the through hole and the trigger lever may adversely facilitate entry of foreign matters into the housing. According to the configuration above, the block portion has a shape of a solid of revolution about the rotation axis of the trigger lever, and thus the distance between the outer circumferential surface of the block portion and the facing edge can be maintained constant even while the trigger lever rotates. Thus, at least a clearance section between the outer circumferential surface of the block portion and the facing edge of the clearance between the peripheral edge of the through hole and the trigger lever can be maintained narrow regardless of whichever position the trigger lever assumes. Therefore, the entry of foreign matters into the housing can be suppressed.

DESCRIPTION

Figure 1:
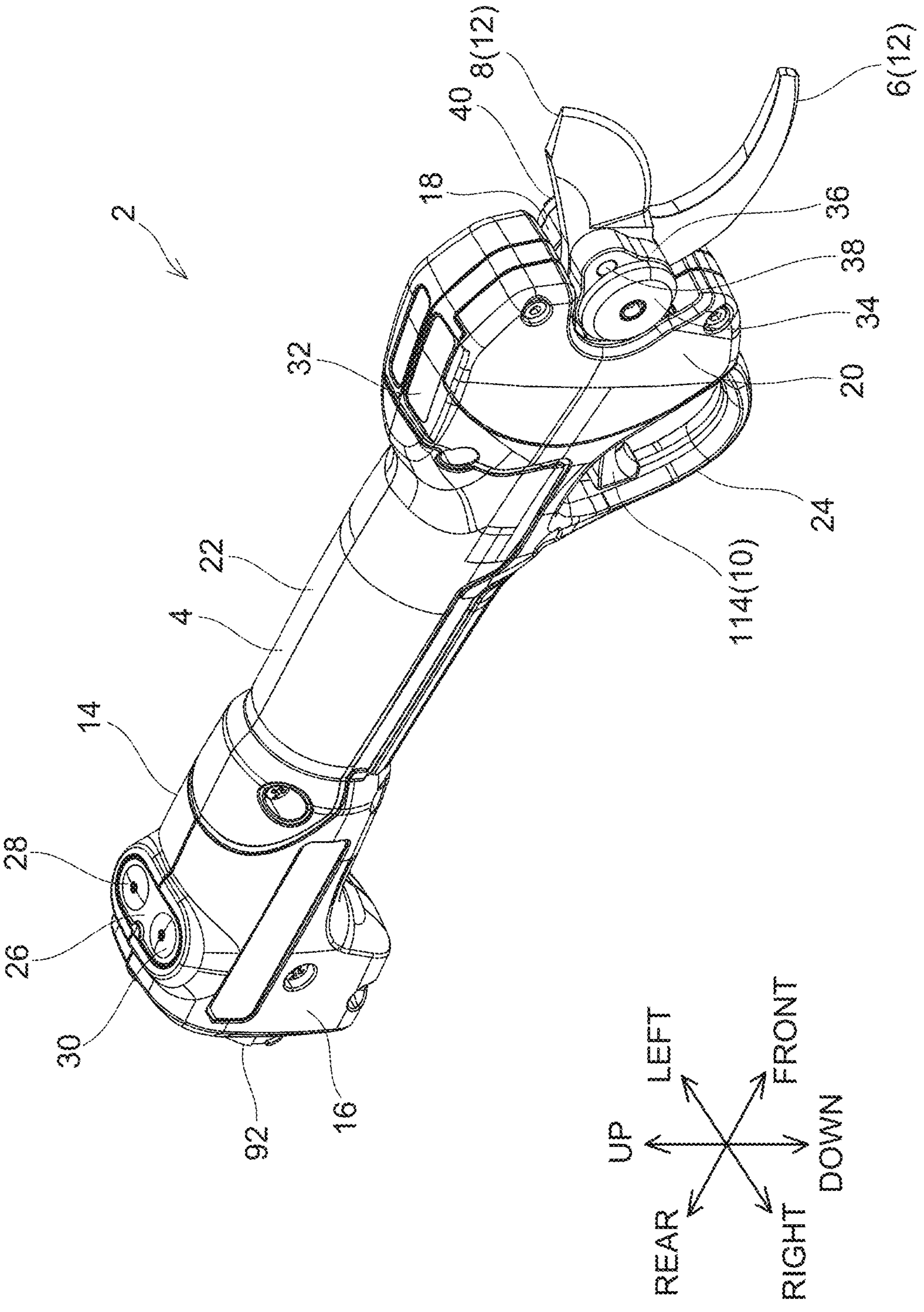
FIG. 1 is a perspective view of a pair of pruners 2 according to an embodiment, as viewed from the upper front right side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved working machines as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the block portion may be arranged to block substantially an entirety of the through hole. The trigger lever may further include a manipulation portion extending from the block portion, disposed outside the housing, and configured to be manipulated by the user and a detection portion extending from the block portion, disposed inside the housing, and configured to be detected by the sensor. The manipulation portion may have a rod shape.

Some general-purpose trigger levers include a manipulation portion that is configured to be manipulated by a user and is made thick in a circumferential direction of its rotation axis. Such a manipulation portion is arranged to extend through a through hole so as to be located inside and outside a housing and is configured to be pushed into the housing by the user. In this configuration, however, the block portion solely does not block substantially the entirety of the through hole. In this case, there is only a single facing edge that faces the outer circumferential surface of the block portion, and thus there is only a single clearance that is maintained narrow regardless of the position of the trigger lever. According to the configuration above, the block portion is arranged to block substantially the entirety of the through hole. In this case, there are two facing edges that face the outer circumferential surface of the block portion such that the two facing edges oppose each other with the block portion interposed therebetween. Thus, there are two clearances that are maintained narrow regardless of the position of the trigger lever. Therefore, entry of foreign matters into the housing can be suppressed over a relatively wide range.

In one or more embodiments, a direction in which the through hole opens from inside of the housing to outside of the housing may be opposite to a direction from the through hole to the working unit.

It is expected that while the working unit is in operation, foreign matters such as dust fly around the working unit. If the through hole opens toward the working unit, the flying foreign matters caused by the operation of the working unit may enter the housing. According to the configuration above, the through hole opens in the opposite direction to the direction from the through hole to the working unit. Therefore, the configuration can suppress the flying foreign matters caused by the operation of the working machine from entering the housing.

In one or more embodiments, the sensor may include at least one of a magnetic sensor and a microswitch.

The configuration above allows the working machine to have a simplified configuration since a general-purpose sensor is used.

In one or more embodiments, a rotational movement of the trigger lever relative to the housing may be limited within a predetermined movable range. The trigger lever may rotate by 45 degrees or less when rotating from one end of the movable range to other end of the movable range.

If the movable range of the trigger lever relative to the housing is too large, the user may find it inconvenient to manipulate the trigger lever. According to the configuration above, the movable range of the trigger lever relative to the housing is limited to the moderate extent. This can reduce the inconvenience for the user to manipulate the trigger lever.

In one or more embodiments, the block portion may be arranged to block substantially an entirety of the through hole. The trigger lever may further include a manipulation portion extending from the block portion, disposed outside the housing, and configured to be manipulated by the user and a detection portion extending from the block portion, disposed inside the housing, and configured to be detected by the sensor. The manipulation portion may have a rod shape. A rotational movement of the trigger lever relative to the housing may be limited within a predetermined movable range. A part of an outer circumference of the block portion that is exposed to an outside of the housing through the through hole while the trigger lever rotates from one end of the movable range to other end of the movable range may be defined as an exposed portion. An angular range of the exposed portion in a circumferential direction of the rotation axis may be 90 degrees or more.

If the block portion occupies a large space inside the housing, the housing has to have an increased size accordingly. The configuration above allows a majority of the block portion to be exposed to the outside of the housing. Thus, the block portion occupies less space inside the housing. Therefore, the housing can have a reduced size.

In one or more embodiments, the working unit may be configured to perform a cutting operation to cut an object or a grinding operation to grind an object.

In the configuration above, powder dust can be generated due to the cutting operation (or the grinding operation) by the working unit. Thus, in the environment where the working machine is used, there may be relatively a large amount of foreign matters that can enter the housing. Therefore, in the configuration above, the effect of suppressing the entry of foreign matters into the housing is remarkably advantageous.

In one or more embodiments, the working machine may be of a handheld type configured to be carried by the user with one hand.

The configuration above provides easy handling of the working machine to the user.

EMBODIMENT

As shown in FIG. 1, a working machine according to the present embodiment is a pair of pruners 2. The pruners 2 are used mainly to cut branches, etc. of trees. The pruners 2 are an electric-powered working machine configured to operate with electric power supplied from an external power source. The pruners 2 are configured to be gripped and carried by a user with one hand.

The pruners 2 include a housing 4, a fixed blade 6, a movable blade 8, and a trigger lever 10. The pruners 2 performs a cutting operation by pivoting the movable blade 8 relative to the fixed blade 6 in response to the trigger lever 10 being pulled upward, details of which will be described later. The fixed blade 6 and the movable blade 8 are constituted of a metal (e.g., iron). In the disclosure herein, the fixed blade 6 and the movable blade 8 may be collectively termed a "working unit 12".

The housing 4 includes a left housing 14, a right housing 16, a gear housing 18, and a cover housing 20. The left housing 14, the right housing 16, the gear housing 18, and the cover housing 20 are all constituted of plastic. The left housing 14 and the right housing 16 are fixed to each other with screw(s). The gear housing 18 is supported by the left housing 14 and the right housing 16. The cover housing 20 is fixed to the left housing 14 and the right housing 16 with screw(s). The housing 4 forms a grip 22 configured to be gripped by the user and a protector 24 configured to protect the trigger lever 10.

In the disclosure herein, the longitudinal direction of the grip 22 is defined as a front-rear direction. Regarding the front-rear direction, the direction from the grip 22 toward the working unit 12 is defined as a front direction, and the direction from the working unit 12 toward the grip 22 is defined as a rear direction. Further, the direction that is perpendicular to the front-rear direction and along a pivot axis of the movable blade 8 is defined as a right-left direction. Regarding the right-left direction, the direction from the movable blade 8 toward the fixed blade 6 is defined as a left direction, and the direction from the fixed blade 6 toward the movable blade 8 is defined as a right direction. Moreover, the direction perpendicular to the front-rear direction and the right-left direction is defined as an up-down direction. Regarding the up-down direction, the direction from the protector 24 toward the trigger lever 10 is defined as an up direction, and the direction from the trigger lever 10 toward the protector 24 is defined as a down direction.

An operation unit 26 is located on an upper rear portion of the housing 4. The operation unit 26 includes a power switch 28 for switching on/off of the main power, an adjustment switch 30 (details of which will be described later), etc. Further, a display unit 32 is located on an upper front portion of the housing 4. The display unit 32 includes an LED for displaying on/off state of the main power and the like (not shown), etc.

Figure 2:
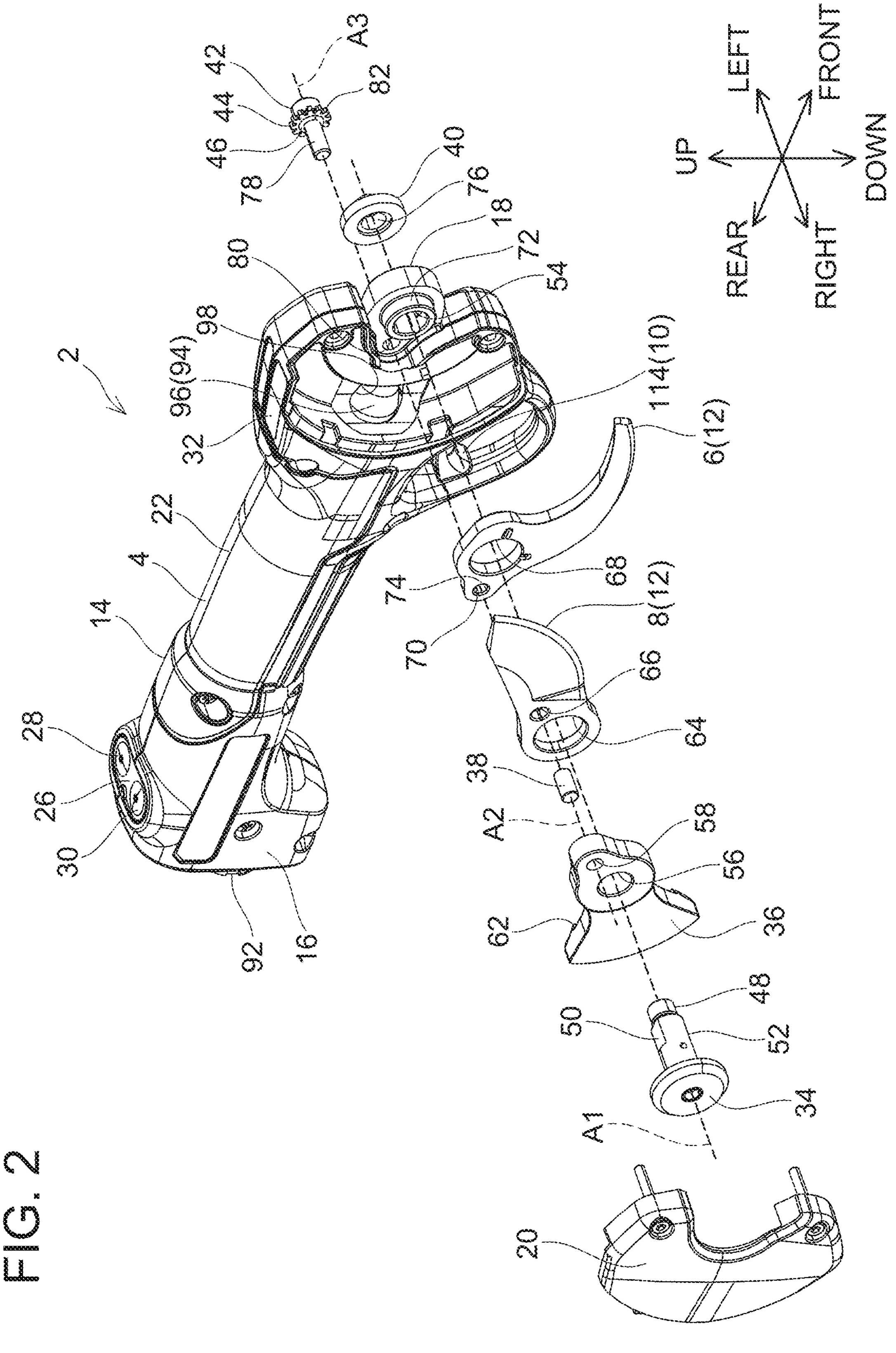
FIG. 2 is an exploded view of the pruners 2 according to the embodiment, illustrating a configuration of a working unit 12 and its vicinity.

As shown in FIG. 2, the pruners 2 further include a bolt 34, a blade holder 36, a coupling pin 38, a nut 40, a lock screw 42, a lock plate 44, and an O-ring 46. In this embodiment, the center axis of the bolt 34 is termed an "axis A1", the center axis of the coupling pin 38 is termed an "axis A2", and the center axis of the lock screw 42 is termed an "axis A3". The axes A1, A2, A3 all extend along the right-left direction.

The bolt 34 includes an externally threaded portion 48, a fitting portion 50, and a cylindrical portion 52 located in this order from the left. The bolt 34 is a so-called shoulder bolt. The fitting portion 50 has a shape corresponding to a fitting hole 54 defined in the gear housing 18.

The blade holder 36 includes a first through hole 56 and a second through hole 58 located forward of the first through hole 56. The first through hole 56 receives the cylindrical portion 52 of the bolt 34 such that the cylindrical portion 52 is rotatable. Thus, the blade holder 36 is rotatable about the axis A1 relative to the gear housing 18. A right portion of the coupling pin 38 is inserted in the second through hole 58. The coupling pin 38 is fixed to the blade holder 36 with its right portion inserted in the second through hole 58. Further, a first cylindrical portion 60 (see FIG. 8) projecting leftward from the periphery of the first through hole 56 and a bevel gear 62 are formed on the left surface of the blade holder 36.

The movable blade 8 includes a third through hole 64 in which the first cylindrical portion 60 of the blade holder 36 is inserted and a fourth through hole 66 in which a left portion of the coupling pin 38 is inserted. The movable blade 8 is restrained by the blade holder 36 with respect to the axis A1 and the axis A2. Therefore, the movable blade 8 is rotatable about the axis A1 integrally with the blade holder 36, relative to the gear housing 18.

The fixed blade 6 includes a fifth through hole 68 and a sixth through hole 70 located rearward of the fifth through hole 68. A second cylindrical portion 72 projecting rightward from the right surface of the gear housing 18 is inserted in the fifth through hole 68. An internally threaded portion 74 is located on the inner surface of the sixth through hole 70.

The nut 40 includes an internally threaded portion 76 corresponding to the externally threaded portion 48 of the bolt 34. The bolt 34 and the nut 40 fasten the blade holder 36, the movable blade 8, and the fixed blade 6 together to the gear housing 18 by screwing the externally threaded portion 48 to the internally threaded portion 76. Specifically, the bolt 34 and the nut 40 restrain the blade holder 36, the movable blade 8, and the fixed blade 6 in the right-left direction. The user can adjust a force that fastens the gear housing 18, the fixed blade 6, the movable blade 8, and the blade holder 36 in the right-left direction (which will be termed a "fastening force" hereinafter) by tightening (or loosening) the nut 40 to (or from) the bolt 34. If the fastening force is too weak, the cutting performance of the pruners 2 may degrade because the movable blade 8 wobbles against the fixed blade 6. Contrary to this, if the fastening force is too strong, the movable blade 8 may experience a large resisting force when pivoting relative to the fixed blade 6, which may increase a load on an electric motor 86 (see FIG. 3) configured to pivot the movable blade 8.

The lock screw 42 includes an externally threaded portion 78 corresponding to the internally threaded portion 74 of the fixed blade 6. Further, a seventh through hole 80 is defined rearward of the fitting hole 54 in the gear housing 18, and the seventh through hole 80 is configured to allow the externally threaded portion 78 of the lock screw 42 to pass therethrough. The fixed blade 6 is fastened to the gear housing 18 by inserting the externally threaded portion 78 of the lock screw 42 in the seventh through hole 80 and then screwing the externally threaded portion 78 into the internally threaded portion of the fixed blade 6. Thus, the fixed blade 6 is fixed to the gear housing 18.

The lock plate 44 and the O-ring 46 are attached to the lock screw 42. The lock plate 44 and the O-ring 46 function as a so-called washer. The lock plate 44 includes a plurality of teeth 82 on its outer periphery. The nut 40 also includes a plurality of teeth corresponding to the plurality of teeth 82 of the lock plate 44 on its outer periphery, although this is not shown. When the fixed blade 6 is to be fixed to the gear housing 18, the lock screw 42 is tightened with the teeth 82 of the lock plate 44 meshing with the teeth of the nut 40. Once the lock screw 42 has been completely tightened, the lock plate 44 is prohibited from rotating relative to the gear housing 18, and thus the nut 40 meshing with the lock plate 44 is also prohibited from rotating. Therefore, an unintentional change in the fastening force due to loosening of the nut 40, etc. can be suppressed.

To adjust the fastening force by tightening (or loosening) the nut 40, the lock screw 42 first needs to be loosened and removed. When the lock plate 44 is moved leftward after the lock screw 42 has been removed, the meshing engagement between the nut 40 and the lock plate 44 is released. As a result, the rotation of the nut 40 is permitted, allowing for adjustment of the fastening force.

Figure 3:
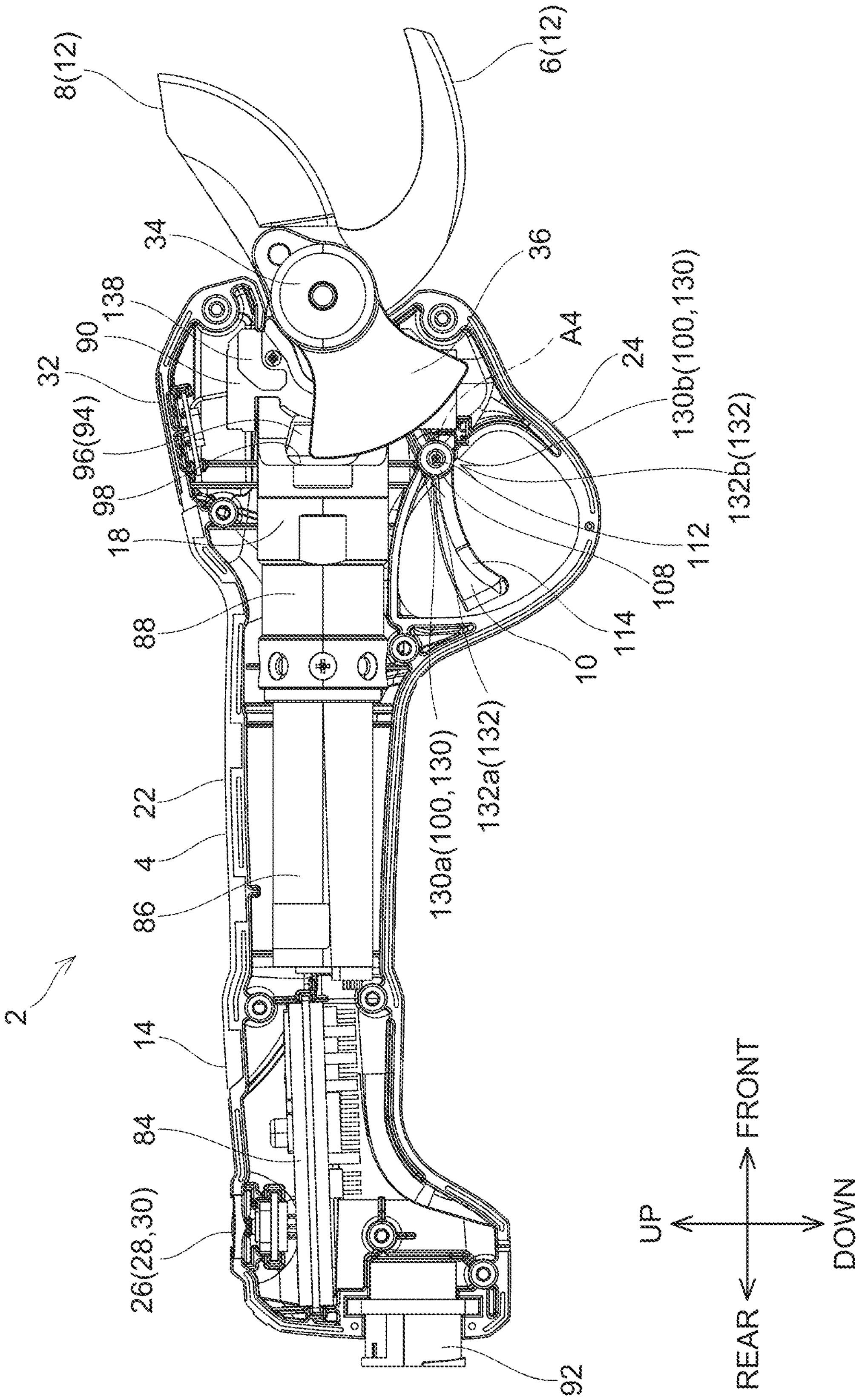
FIG. 3 is a right side view of the internal structure of the pruners 2 according to the embodiment, with a movable blade 8 of the pruners 2 at an open position.

As shown in FIG. 3, the pruners 2 further include a control device 84, an electric motor 86, a power transmission mechanism 88, a sensor board 90, and a connector 92. The control device 84, the electric motor 86, the power transmission mechanism 88, and the sensor board 90 are housed in the housing 4. A part of the connector 92 is housed inside the housing 4, while the remaining part thereof is exposed to the outside of the housing 4. The connector 92 is an interface for electrically connecting the external power source to the pruners 2. For example, a power cable (not shown) extending from the external power source is connected to the connector 92. The pruners 2 can receive electrical power from the external power source through the connector 92.

The control device 84 includes a memory, a CPU, etc. The control device 84 is electrically connected to each of the operation unit 26, the display unit 32, the electric motor 86, the sensor board 90, and the connector 92. The control device 84 controls the pruners 2 according to a predetermined program stored in the memory. For example, depending on the on/off state of the main power, the control device 84 switches the pruners 2 between a state where the electric power supply from the external power source to the electric motor 86 is permitted and a state where the electric power supply is cut off. Further, the control device 84 controls the display unit 32 to display the on/off state of the main power, etc.

The electric motor 86 is for example a brushless motor. The electric motor 86 rotates a motor shaft (not shown) extending along the front-rear direction in response to electric power being supplied thereto.

The power transmission mechanism 88 includes a planetary gear mechanism (not shown) coupled to the motor shaft (not shown) and a gear shaft 94 coupled to the planetary gear mechanism. The planetary gear mechanism reduces the rotational speed of the motor shaft and transmits it to the gear shaft 94. The gear shaft 94 is supported by a bearing (not shown) located inside the gear housing 18 such that it is rotatable about an axis long the front-rear direction. A front portion of the gear shaft 94 has a bevel gear 96 corresponding to the bevel gear 62 (see FIG. 2) on the left surface of the blade holder 36. A part of the gear shaft 94 (the bevel gear 96) meshes with the bevel gear 62 of the blade holder 36 through an opening 98 defined in the right surface of the gear housing 18. The bevel gears 62, 96 convert the rotation of the gear shaft 94 to the rotation of the blade holder 36 and the movable blade 8. When the electric motor 86 is actuated, the power is transmitted to the movable blade 8 via the motor shaft, the planetary gear mechanism, the gear shaft 94, and the bevel gears 62, 96. The movable blade 8 is thereby pivoted.

Figure 4:
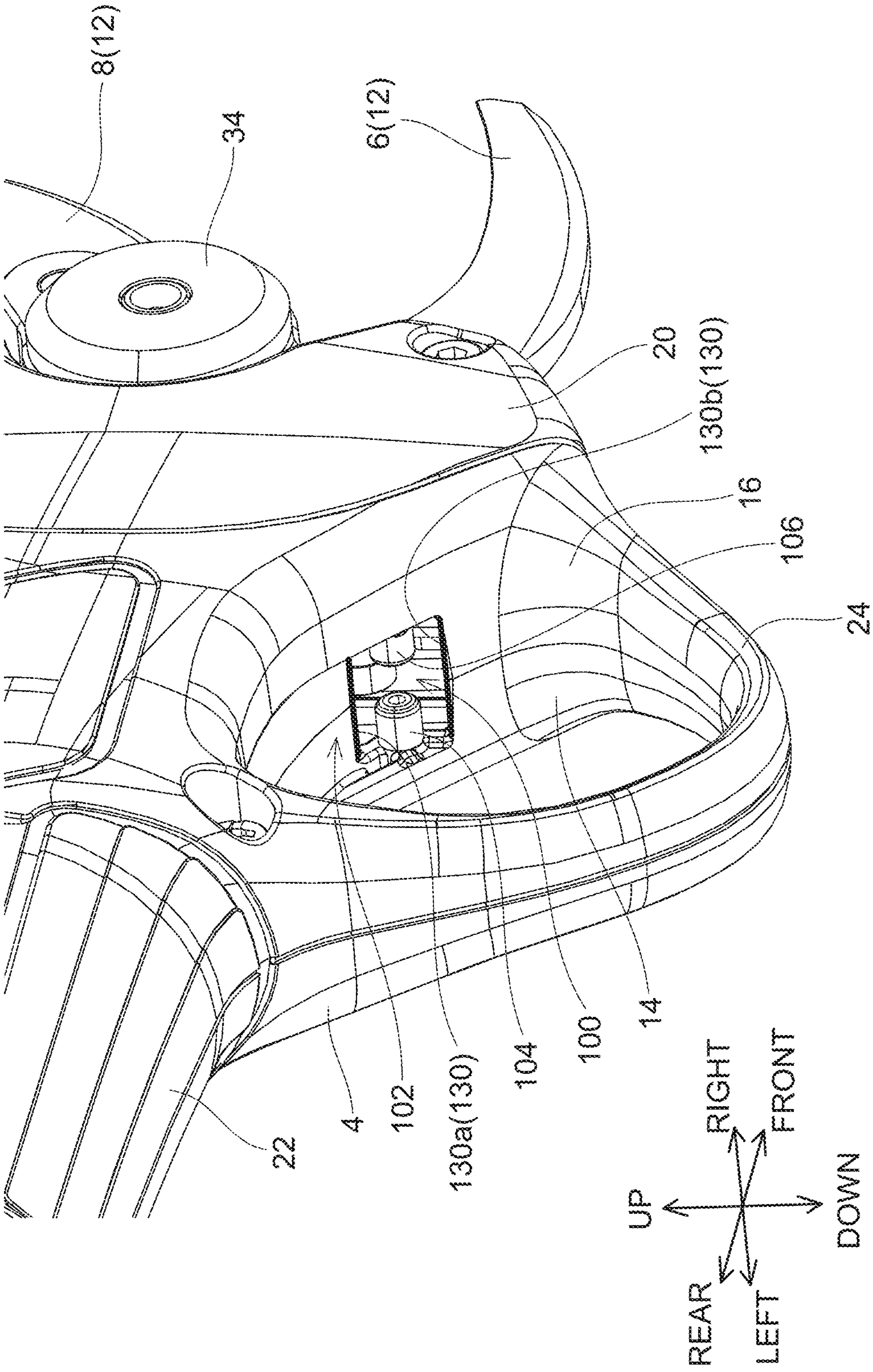
FIG. 4 shows a trigger through hole 100 defined in a housing 4 of the pruners 2 according to the embodiment, as viewed from the lower rear right side.

As shown in FIG. 4, the housing 4 includes a trigger through hole 100 configured to allow the trigger lever 10 (see FIG. 1) to pass therethrough. The trigger through hole 100 is defined in a bottom wall of a recess 102 in the outer surface of the housing 4. The recess 102 and the trigger through hole 100 are located at a position where the left housing 14 and the right housing 16 are connected to each other. The direction in which the trigger through hole 100 opens from the inside of the housing 4 to the outside of the housing 4 (obliquely rearward and downward in the example of FIG. 4) is opposite to the direction from the trigger through hole 100 to the working unit 12 (obliquely frontward and upward in the example of FIG. 4). Further, the left housing 14 includes a left shaft 104 projecting rightward at the position where the trigger through hole 100 is located. The right housing 16 includes a right shaft 106 projecting leftward at the position where the trigger through hole 100 is located. The left shaft 104 and the right shaft 106 face each other in the right-left direction.

Figure 5:
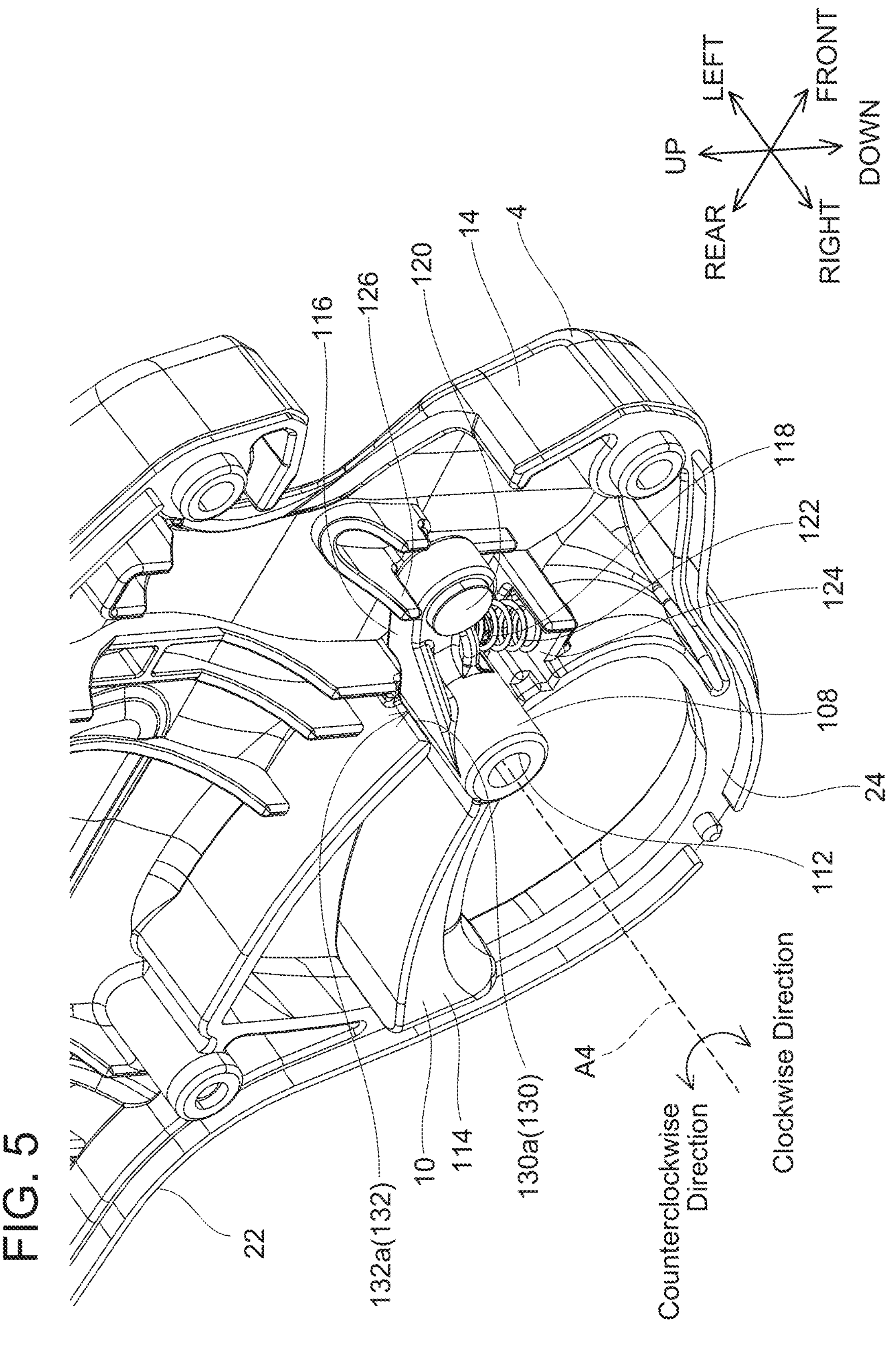
FIG. 5 shows a configuration of a trigger lever 10 of the pruners 2 according to the embodiment and its vicinity.

As shown in FIG. 5, the trigger lever 10 includes a block portion 108 arranged to block substantially the entirety of the trigger through hole 100 (see FIG. 4). The block portion 108 includes a left recess 110 (see FIG. 8) in which the left shaft 104 (see FIG. 4) is inserted and a right recess 112 in which the right shaft 106 (see FIG. 4) is inserted. The trigger lever 10 is rotatably supported by the housing 4 via the left shaft 104 and the right shaft 106. In this embodiment, the rotation axis of the trigger lever 10 is termed an "axis A4". Further, regarding the circumferential direction of the axis A4, the clockwise direction in the right side view is termed a "clockwise direction", and the counterclockwise direction in the right side view is termed a "counterclockwise direction". The block portion 108 has a shape of a solid of revolution (e.g., a solid cylinder) about the axis A4. The outer diameter of the block portion 108 is in the range from 5 mm to 11 mm, and in this embodiment, it is approximately 8 mm.

The trigger lever 10 further includes a manipulation portion 114 extending rearward and downward from the block portion 108, an arm portion 116 extending forward and upward from the block portion 108, and a projection 118 projecting downward from a lower surface of the arm portion 116. The block portion 108, the manipulation portion 114, the arm portion 116, and the projection 118 are seamlessly integral with each other. The block portion 108, the manipulation portion 114, the arm portion 116, and the projection 118 are constituted of plastic. The manipulation portion 114 is located outside the housing 4. The manipulation portion 114 is positioned such that it can be manipulated by the index finger of a hand gripping the grip 22. The manipulation portion 114 has a curved rod shape that is gradually curved downward from the front toward the rear. The width of the manipulation portion 114 (i.e., the dimension thereof in the right-left direction) is substantially constant between its base end (i.e., the end connected to the block portion 108) to its distal end. The thickness of the manipulation portion 114 (i.e., the dimension thereof in the up-down direction) is increased from the base end toward the distal end. The arm portion 116 is located inside the housing 4. A magnet 120 is fixed to the right surface of the arm portion 116. A coil spring 122 is attached around the projection 118. The upper end of the coil spring 122 is in contact with the lower surface of the arm portion 116. A lower portion of the coil spring 122 is in contact with a spring receiving surface 124 of the housing 4. The coil spring 122 biases the arm portion 116 upward relative to the housing 4. In other words, the coil spring 122 biases the trigger lever 10 in the counterclockwise direction relative to the housing 4. The depiction of the coil spring 122 is omitted in the drawings other than FIG. 5 for the sake of simplicity.

A stopper portion 126 is located inside the housing 4, and the upper surface of the arm portion 116 contacts the stopper portion 126 when the trigger lever 10 rotates in the counterclockwise direction. In the state where the trigger lever 10 is in contact with the stopper portion 126, the trigger lever 10 is prohibited from further rotating in the counterclockwise direction. In the disclosure herein, the position of the trigger lever 10 in this state is termed a "zero position". In the state where the trigger lever 10 is not manipulated by the user, the trigger lever 10 is held at the zero position by the biasing force of the coil spring 122. When the user pulls up the manipulation portion 114 of the trigger lever 10 at the zero position against the biasing force of the coil spring 122, the trigger lever 10 is rotated in the clockwise direction. As the clockwise rotation of the trigger lever 10 continues, the upper surface of the manipulation portion 114 finally contacts the outer surface of the housing 4. In the state where the upper surface of the manipulation portion 114 is in contact with the outer surface of the housing 4, the trigger lever 10 is prohibited from further rotating in the clockwise direction. In the disclosure herein, the position of the trigger lever 10 in this state is termed a "maximally pulled position".

Figure 6:
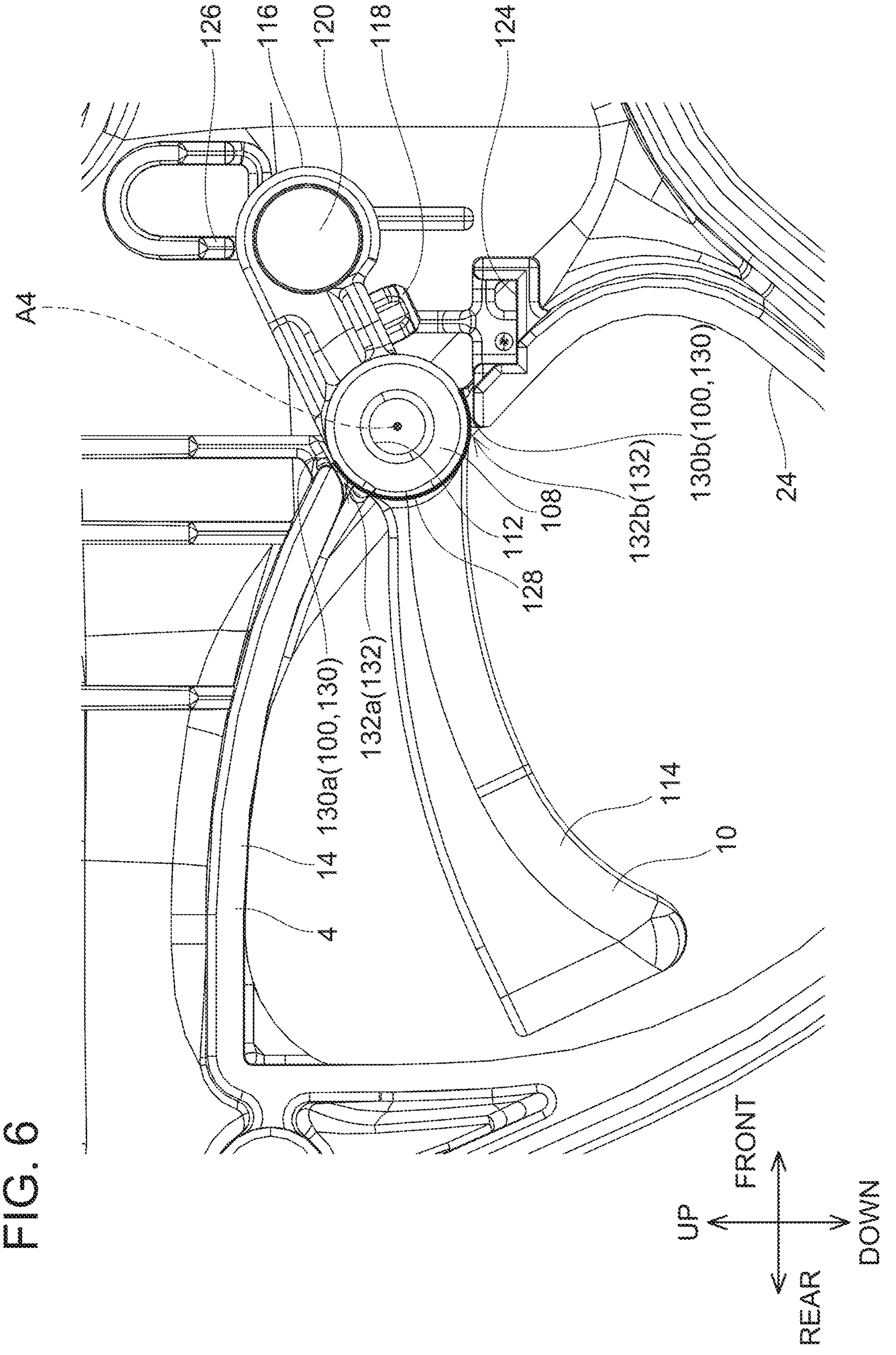
FIG. 6 is a right side view of the trigger lever 10 of the pruners 2 according to the embodiment, with the trigger lever 10 at a zero position.
Figure 7:
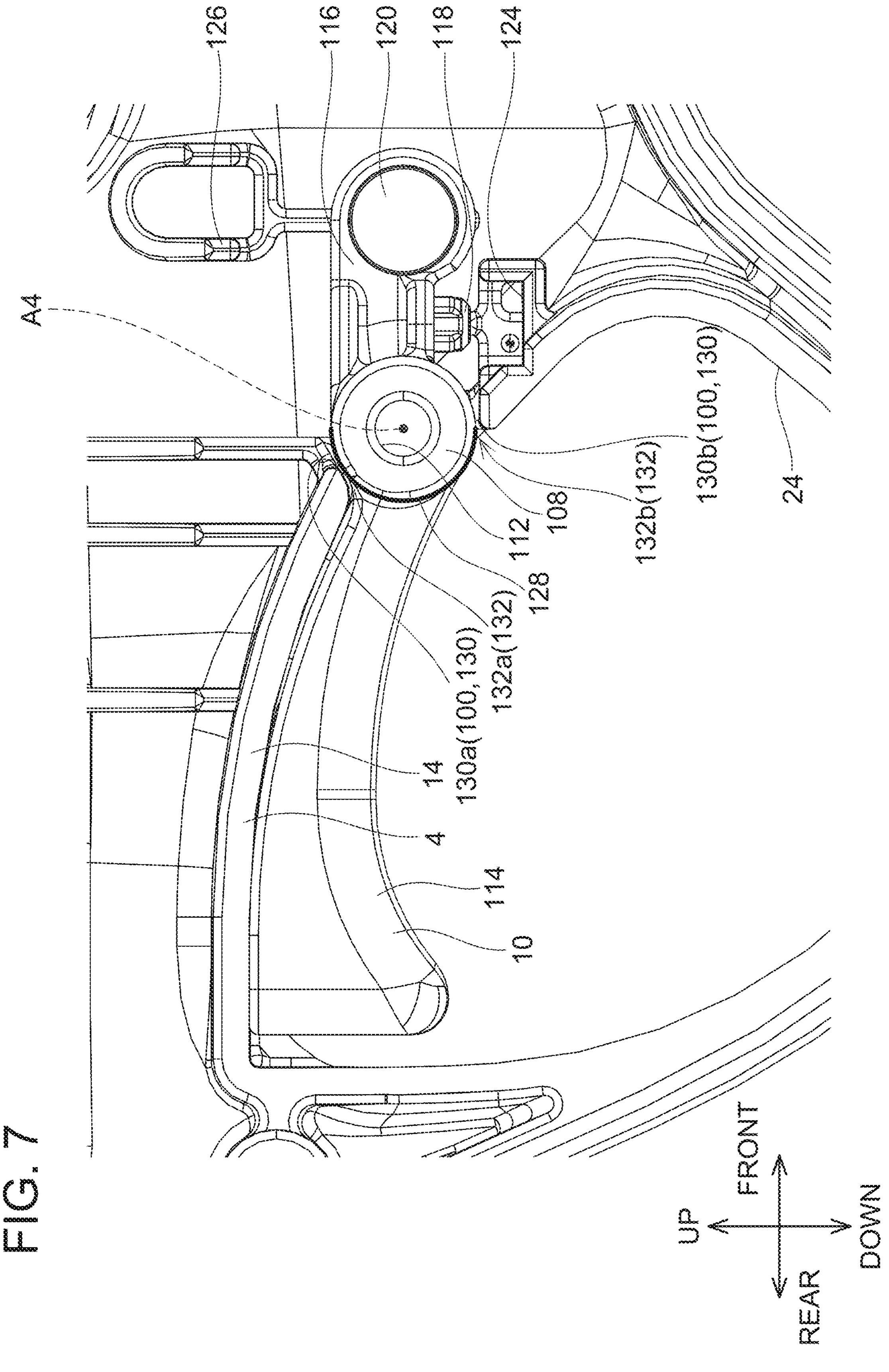
FIG. 7 is a right side view of the trigger lever 10 of the pruners 2 according to the embodiment, with the trigger lever 10 at a maximally pulled position.

FIG. 6 shows the trigger lever 10 at the zero position. FIG. 7 shows the trigger lever 10 at the maximally pulled position. The rotational movement of the trigger lever 10 is limited to the range between the zero position and the maximally pulled position. When rotating from the zero position to the maximally pulled position, the trigger lever 10 rotates by an angle within the range from 10 degrees to 40 degrees, and in this embodiment by 25 degrees.

Portions of the peripheral edge of the trigger through hole 100 shown in FIG. 4 that face the outer circumferential surface of the block portion 108 (see FIG. 5) are termed "facing edges 130". One of the facing edges 130 that is located above the block portion 108 is termed an "upper facing edge 130*a*" and the other facing edge 130 located below the block portion 108 is termed a "lower facing edge 130*b*". The upper facing edge 130*a* and the lower facing edge 130*b* both extend substantially parallel to the axis A4. In FIG. 4, the facing edges 130 are emphasized with bold lines.

As shown in FIGS. 6 and 7, the facing edges 130 are slightly spaced apart from the outer circumferential surface of the block portion 108. Thus, there are clearances 132 between the facing edges 130 and the outer circumferential surface of the block portion 108. The clearances 132 are provided for allowing smooth rotation of the trigger lever 10. In this embodiment, the block portion 108 has a shape of a solid of revolution about the axis A4. Therefore, the size of the clearances 132 between the facing edges 130 and the outer circumferential surface of the block portion 108 is maintained constant regardless of the rotation of the trigger lever 10.

A portion of the circumference of the block portion 108 that is exposed to the outside of the housing 4 through the trigger through hole 100 while the trigger lever 10 rotates from the zero position to the maximally pulled position is termed an "exposed portion 128". Here, "the outside of the housing 4" strictly means a range from the narrowest portion of the upper clearance 132*a* through the exterior of the housing 4 to the narrowest portion of the lower clearance 132*b* in the right side view". In FIGS. 6 and 7, the exposed portion 128 is emphasized with a bold line. The angle range of the exposed portion 128 in the circumferential direction of the axis A4 is within the range from 100 degrees to 160 degrees, and in this embodiment 130 degrees.

Figure 8:
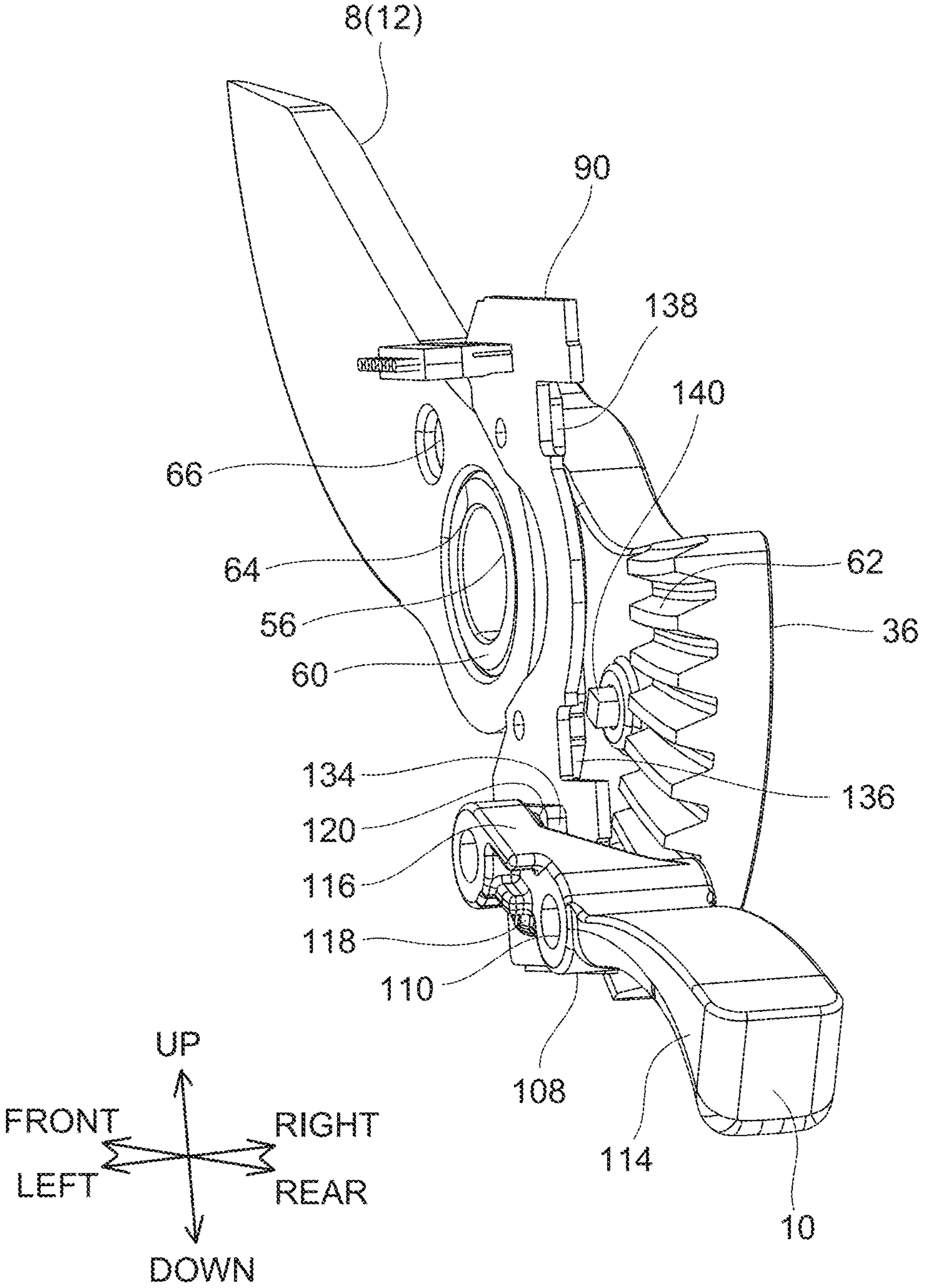
FIG. 8 shows a configuration of a sensor board 90 of the pruners 2 according to the embodiment and its vicinity.

The sensor board 90 shown in FIG. 8 is a magnetic sensor. The sensor board 90 is fixed to the gear housing 18 (see FIG. 3) with screw(s) (not shown). The sensor board 90 extends in the front-rear direction and the up-down direction. The sensor board 90 includes a first Hall element 134, a second Hall element 136, and a third Hall element 138. The first Hall element 134 is located in a lower portion of the sensor board 90 on the left surface of the sensor board 90. The second Hall element 136 is located above the first Hall element 134 on the right surface of the sensor board 90. The third Hall element 138 is located above the second Hall element 136 on the right surface of the sensor board 90. The sensor board 90 detects magnetism by the first Hall element 134, the second Hall element 136, and the third Hall element 138 and outputs the detection results to the control device 84. The detection results output to the control device 84 indicate for example the intensity of magnetism and/or orientation of magnetic field.

The magnet 120 fixed to the right surface of the arm portion 116 faces the left surface of the sensor board 90. When the trigger lever 10 is pulled up, the magnet 120 passes by the first Hall element 134. The magnetism detected by the sensor board 90 (especially by the first Hall element 134) thereby changes. The control device 84 (see FIG. 3) can determine the position of the trigger lever 10 relative to the housing 4 or how much the trigger lever 10 has been pulled up based on the outputs from the sensor board 90.

A magnet 140 is fixed to the left surface of the blade holder 36. The magnet 140 faces the right surface of the sensor board 90. When the movable blade 8 pivots, the blade holder 36 also pivots accordingly, and thus the magnet 140 changes in position relative to the sensor board 90. The magnetism detected by the sensor board 90 (especially by the second Hall element 136 and the third Hall element 138) thereby changes. The control device 84 (see FIG. 3) can determine the position of the movable blade 8 relative to the housing 4 or how much the movable blade 8 has pivoted based on the outputs from the sensor board 90.

Normal Mode of Pruners 2

Hereinafter, how the pruners 2 operate in normal times will be described. Here, the normal times mean for example when the user uses the pruners 2 for cutting work. In this embodiment, the operation mode of the pruners 2 in these times is termed a normal mode.

Figure 9:
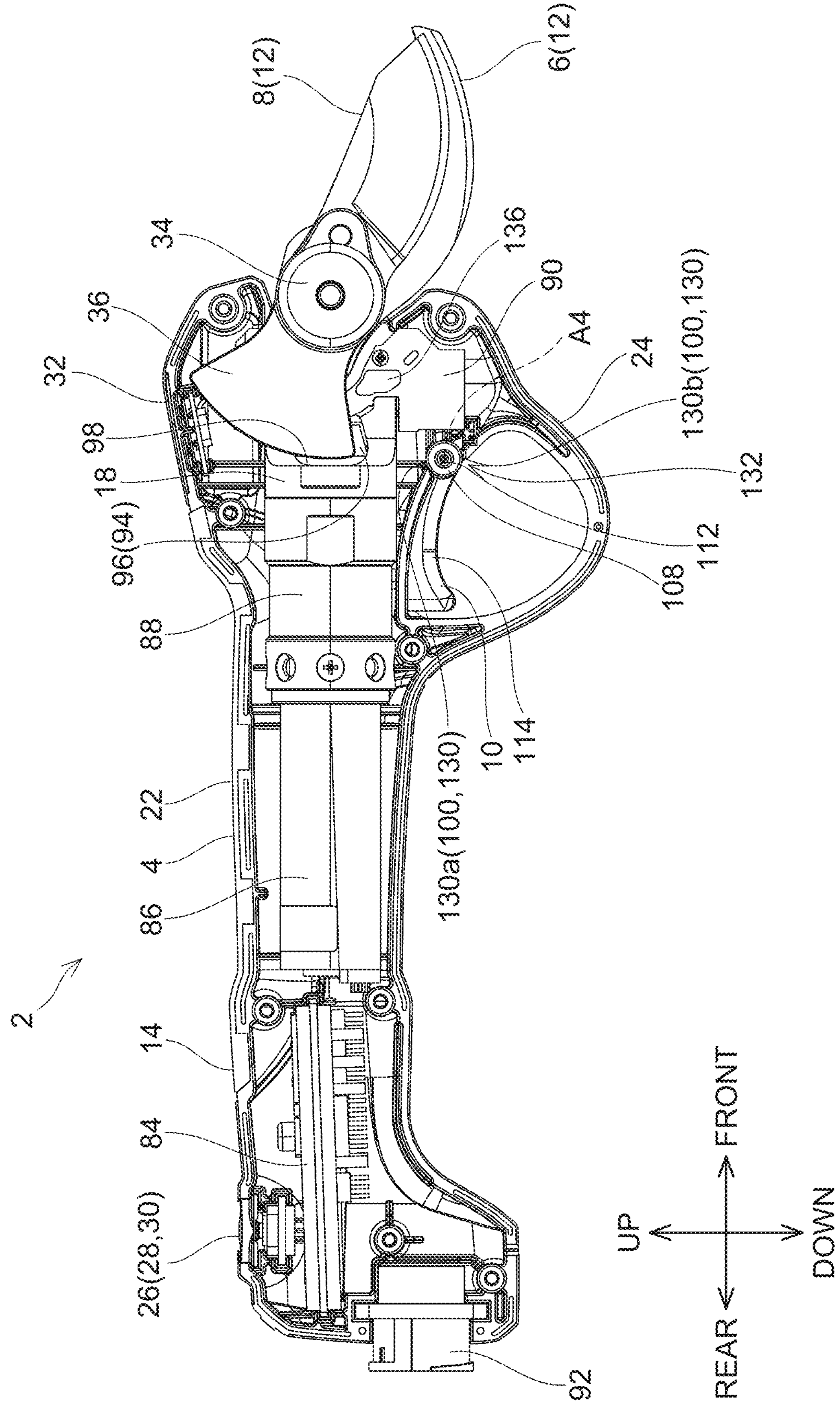
FIG. 9 is a right side view of the internal structure of the pruners 2 according to the embodiment, with the movable blade 8 of the pruners 2 at a closed position

As shown in FIG. 3, when the trigger lever 10 is at the zero position, the control device 84 drives the electric motor 86 to hold the movable blade 8 open (or at an open position) relative to the fixed blade 6. Then, when the trigger lever 10 is pulled up, the control device 84 drives the electric motor 86 to move the movable blade 8 closer to the fixed blade 6 according to how much the trigger lever 10 has been pulled up. Specifically, the control device 84 pivots the movable blade 8 toward the fixed blade 6 by a pivot amount corresponding to the pulled amount of the trigger lever 10. As shown in FIG. 9, when the trigger lever 10 is at the maximally pulled position, the movable blade 8 is held closed (or at a closed position) to the fixed blade 6. Then, when the pulling manipulation on the trigger lever 10 is released, the control device 84 drives the electric motor 86 to return the movable blade 8 to the open position. In the normal mode, the user can make the pruners 2 perform a cutting operation by pulling up the trigger lever 10.

The control device 84 switches the open position of the movable blade 8 between a first open position and a second open position which is closer to the closed position than the first open position is, in response to a first manipulation (e.g., a short press) on the adjustment switch 30. By using this function, the user can select a suitable open position depending on the thickness of an object to be cut. The open position may be switched to other position(s) other than the first open position and the second open position.

Cut-Depth Fine Adjustment Mode of Pruners 2

In response to a second manipulation (a long press) on the adjustment switch 30, the control device 84 switches the operation mode of the pruners 2 to a cut-depth fine adjustment mode for fine adjustment of a cut depth made by the fixed blade 6 and the movable blade 8. Here, the cut depth means a width of an overlap between the fixed blade 6 and the movable blade 8 when the movable blade 8 is at the closed position. If the cut depth is small, the fixed blade 6 and the movable blade 8 may not be able to completely cut off an object to be cut. In the cut-depth fine adjustment mode, the control device 84 increases the cut depth each time the trigger lever 10 is pulled up from the zero position, although this is not shown. Once the trigger lever 10 has been pulled up from the zero position predetermined number of times, the control device 84 resets the cut depth to the original depth. In the cut-depth fine adjustment mode, the user can adjust the cut depth to a suitable depth by pulling up the trigger lever 10. In response to a third manipulation (a short press or a long press) on the adjustment switch 30, the control device 84 switches the operation mode of the pruners 2 to the normal mode.

Variants

The configuration of the trigger lever 10 and its vicinity is not limited to the application in the pruners 2 but may be applied to working machines according to other aspects. Here, the working machines according to other aspects include for example a mower, shears, a riveter, and a grinder.

The working machine is not limited to being a handheld type configured to be carried by the user with one hand. The working machine may be hard for the user to carry with just one hand.

The working machine may be configured to allow a rechargeable battery pack to be attached thereto. In this case, the working machine may operate with electric power supplied from the battery pack.

The working machine may include a prime mover (e.g., a brush motor, an engine) other than a brushless motor, instead of the electric motor 86.

The block portion 108 may have a shape of a solid of revolution other than a solid cylinder. For example, the block portion 108 may be a circular truncated cone.

The manipulation portion 114 may have a shape other than the rod shape. For example, the manipulation portion 114 may have a shape that is thick in the circumferential direction of the rotation axis. In this case, the manipulation portion 114 may extend through the trigger through hole 100 so as to be located inside and outside the housing 4. In this configuration, however, there is only a single facing edge 130 facing the outer circumferential surface of the block portion 108.

The block portion 108 may not be arranged so as to block substantially the entirety of the trigger through hole 100. That is, the block portion 108 may be arranged so as to partially block the trigger through hole 100.

The direction in which the trigger through hole 100 opens may be changed as needed. For example, the trigger through hole 100 may open in the direction from the trigger through hole 100 toward the working unit 12.

The left shaft 104 and the right shaft 106 may be separate parts from the housing 4. In this case, the left shaft 104 and the right shaft 106 may be inserted to the left recess 110 and the right recess 112, respectively, and be supported by the housing 4. The trigger lever 10 may be rotatable relative to the housing 4 in this way.

The block portion 108 may include a through hole that extends through the block portion 108 in the right-left direction, instead of the left recess 110 and the right recess 112. The left shaft 104 may be inserted in this through hole from the left. The right shaft 106 may be inserted in this through hole from the right. The trigger lever 10 may be rotatable relative to the housing 4 in this way. Alternatively, the left shaft 104 and the right shaft 106 may be replaced by a single shaft extending through the above-described through hole. In this case, the left and right surfaces of the block portion 108 may be in contact with the peripheral edge of the trigger through hole 100. The trigger lever 10 may be thereby prohibited from moving in the right-left direction relative to the housing 4.

The working machine may include a microswitch instead of the sensor board 90. The microswitch may be positioned so as to be pressed by the arm portion 116 of the trigger lever 10 when the trigger lever 10 is rotated in the clockwise direction. The control device 84 may determine whether the trigger lever 10 has been pulled up or not based on output from the microswitch.

The working machine may include a sensor (e.g., a photosensor) other than the sensor board 90 and a microswitch.

The trigger lever 10 may rotate by less than 10 degrees or by more than 40 degrees when the trigger lever 10 rotates from the zero position to the maximally pulled position.

The angle range of the exposed portion 128 in the circumferential direction of the axis A4 may be less than 100 degrees or more than 130 degrees.

Features of Embodiment

As described, in one or more embodiments, the pruners 2 (an example of working machine) comprises the working unit 12, the electric motor 86 (an example of prime mover) configured to drive the working unit 12, the housing 4 that supports the working unit 12 and houses the electric motor 86, the trigger lever 10 extending through the trigger through hole 100 (an example of through hole) defined in the housing 4 so as to be located inside and outside the housing 4 and configured to be manipulated by a user, the sensor board (an example of sensor) disposed inside the housing 4 and configured to detect a movement of a portion of the trigger lever 10 located inside the housing 4, and the control device 84 (an example of control unit) configured to control the electric motor 86 based on a detection result by the sensor board 90. The trigger lever 10 is rotatably supported by the housing 4 via the left shaft 104 and the right shaft 106 (an example of rotation shaft). The trigger lever 10 includes the block portion 108 that has a shape of a solid of revolution about the axis A4 (an example of rotation axis of the trigger lever). The peripheral edge of the trigger through hole 100 includes the facing edges 130 that face the outer circumferential surface of the block portion 108.

The trigger lever 10 can assume various positions relative to the housing 4. Depending on the position of the trigger lever 10, clearances between the peripheral edge of the trigger through hole 100 and the trigger lever 10 may be enlarged. Such an enlarged clearance between the peripheral edge of the trigger through hole 100 and the trigger lever 10 may adversely facilitate entry of foreign matters into the housing 4. According to the configuration above, the block portion 108 has a shape of a solid of revolution about the rotation axis of the trigger lever 10, and thus the distances between the outer circumferential surface of the block portion 108 and the facing edges 130 can be maintained constant even while the trigger lever 10 rotates. Thus, at least the clearances 132 between the outer circumferential surface of the block portion 108 and the facing edges 130 of clearances between the peripheral edge of the trigger through hole 100 and the trigger lever 10 can be maintained narrow regardless of whichever position the trigger lever 10 assumes. Therefore, the entry of foreign matters into the housing 4 can be suppressed.

In one or more embodiments, the block portion 108 is arranged to block substantially the entirety of the trigger through hole 100. The trigger lever 10 further includes the manipulation portion 114 extending from the block portion 108, disposed outside the housing 4, and configured to be manipulated by the user; and the arm portion 116 and the magnet 120 (an example of detection portion) extending from the block portion 108, disposed inside the housing 4, and configured to be detected by the sensor board 90. The manipulation portion 114 has a rod shape.

According to the configuration above, the block portion 108 is arranged to block substantially the entirety of the trigger through hole 100. In this case, there are two facing edges 130 (the upper facing edge 130*a* and the lower facing edge 130*b*) that face the outer circumferential surface of the block portion 108 such that the two facing edges oppose each other with the block portion 108 interposed therebetween. Thus, there are two clearances 132 (the upper clearance 132*a* and the lower clearance 132*b*) that are maintained narrow regardless of the position of the trigger lever 10. Therefore, the entry of foreign matters into the housing 4 can be suppressed over a relatively wide range.

In one or more embodiments, the direction in which the trigger through hole 100 opens from inside of the housing 4 to outside of the housing 4 is opposite to the direction from the trigger through hole 100 to the working unit 12.

It is expected that while the working unit 12 is in operation, foreign matters such as dust fly around the working unit 12. If the trigger through hole 100 opens toward the working unit 12, the flying foreign matters caused by the operation of the working unit 12 may enter the housing 4. According to the configuration above, the trigger through hole 100 opens in the opposite direction to the direction from the trigger through hole 100 to the working unit 12. Therefore, the configuration can suppress the flying foreign matters caused by the operation of the working unit 12 from entering the housing 4.

In one or more embodiments, the sensor may include a magnetic sensor (an example of at least one of a magnetic sensor and a microswitch).

The configuration above allows the pruners 2 to have a simplified configuration since a general-purpose sensor is used.

In one or more embodiments, the rotational movement of the trigger lever 10 relative to the housing 4 is limited within a predetermined movable range. The trigger lever 10 rotates by 45 degrees or less when rotating from the zero position (an example of one end of the movable range) to the maximally pulled position (an example of other end of the movable range).

If the movable range of the trigger lever 10 relative to the housing 4 is too large, the user may find it inconvenient to manipulate the trigger lever 10. According to the configuration above, the movable range of the trigger lever 10 relative to the housing 4 is limited to the moderate extent. This can reduce the inconvenience for the user to manipulate the trigger lever 10.

In one or more embodiments, the block portion 108 is arranged to block substantially the entirety of the trigger through hole 100. The trigger lever 10 further includes the manipulation portion 114 extending from the block portion 108, disposed outside the housing 4, and configured to be manipulated by the user; and the arm portion 116 and the magnet 120 extending from the block portion 108, disposed inside the housing 4, and configured to be detected by the sensor board 90. The manipulation portion 114 has a rod shape. The rotational movement of the trigger lever 10 relative to the housing 4 is limited within a predetermined movable range. A part of the outer circumference of the block portion 108 that is exposed outside of the housing 4 through the trigger through hole 100 while the trigger lever 10 rotates from the zero position to the maximally pulled position is defined as the exposed portion 128. The angular range of the exposed portion 128 in the circumferential direction of the axis A4 is 90 degrees or more.

If the block portion 108 occupies a large space inside the housing 4, the housing 4 has to have an increased size accordingly. The configuration above allows a majority of the block portion 108 to be exposed to the outside of the housing 4. Thus, the block portion 108 occupies less space inside the housing 4. Therefore, the housing 4 can have a reduced size.

In one or more embodiments, the working unit 12 is configured to perform a cutting operation to cut an object or a grinding operation to grind an object.

In the configuration above, powder dust can be generated due to the cutting operation by the working unit 12. Thus, in the environment where the pruners 2 are used, there may be relatively a large amount of foreign matters that can enter the housing 4. Therefore, in the configuration above, the effect of suppressing the entry of foreign matters into the housing 4 is remarkably advantageous.

In one or more embodiments, the pruners 2 are a working machine of a handheld type configured to be carried by the user with one hand.

The configuration above provides easy handling of the pruners 2 to the user.

What is claimed is:

1. A working machine, comprising:
- a working unit;
- a prime mover configured to drive the working unit;
- a housing that supports the working unit and houses the prime mover;
- a trigger lever, extending through a through hole defined in the housing, so as to be located inside and outside the housing, wherein the trigger lever includes a manipulation portion outside the housing which is configured to be manipulated by a user, and the trigger lever includes a detection portion inside the housing;
- a sensor disposed inside the housing and configured to detect a movement of the detection portion of the trigger lever located inside the housing; and
- a control unit configured to control the prime mover based on a detection result by the sensor, wherein
- the trigger lever is rotatably supported by the housing via a rotation shaft,
- the trigger lever includes a block portion that has a shape of a solid cylinder that is centered on a rotation axis of the trigger lever, wherein the manipulation portion extends from the block portion and the detection portion extends from the block portion, and
- a peripheral edge of the through hole includes a facing edge that faces an outer circumferential surface of the block portion.

2. The working machine according to claim 1, wherein
- the block portion is arranged to block substantially an entirety of the through hole,
- the manipulation portion has a rod shape.

3. The working machine according to claim 2, wherein
- a direction in which the through hole opens from inside of the housing to outside of the housing is opposite to a direction from the through hole to the working unit,
- the sensor includes at least one of a magnetic sensor and a microswitch,
- a rotational movement of the trigger lever relative to the housing is limited within a predetermined movable range,
- the trigger lever rotates by 45 degrees or less while the trigger lever rotates from one end of the movable range to other end of the movable range,
- a part of an outer circumference of the block portion that is exposed outside of the housing through the through hole while the trigger lever is rotating from one end of the movable range to other end of the movable range is defined as an exposed portion, an angular range of the exposed portion in a circumferential direction of the rotation axis is 90 degrees or more, and the working unit is configured to perform a cutting operation to cut an object.

4. The working machine according to claim 1, wherein a direction in which the through hole opens from inside of the housing to outside of the housing is opposite to a direction from the through hole to the working unit.

5. The working machine according to claim 1, wherein the sensor includes at least one of a magnetic sensor and a microswitch.

6. The working machine according to claim 1, wherein a rotational movement of the trigger lever relative to the housing is limited within a predetermined movable range, and the trigger lever rotates by 45 degrees or less while rotating from one end of the movable range to other end of the movable range.

7. The working machine according to claim 1, wherein the block portion is arranged to block substantially an entirety of the through hole, the manipulation portion has a rod shape, a rotational movement of the trigger lever relative to the housing is limited within a predetermined movable range, a portion of an outer circumference of the block portion that is exposed outside of the housing through the through hole while the trigger lever is rotating from one end of the movable range to other end of the movable range is defined as an exposed portion, and an angular range of the exposed portion in a circumferential direction of the rotation axis is 90 degrees or more.

8. The working machine according to claim 1, wherein the working unit is configured to perform a cutting operation to cut an object.

9. The working machine according to claim 1, wherein a clearance is formed between the facing edge and the outer circumferential surface of the block portion, and a size of the clearance is maintained constant during rotation of the trigger lever.

* * * * *